United States Patent Office 2,925,418
Patented Feb. 16, 1960

2,925,418

NEW TRIAZINES

Jean Druey, Riehen, and Paul Schmidt, Therwil, Switzerland, assignors to Ciba Pharmaceutical Products Inc., Summit, N.J.

No Drawing. Application January 2, 1958
Serial No. 706,591

Claims priority, application Switzerland January 14, 1957

7 Claims. (Cl. 260—249.5)

This invention relates to new v-triazines. More particularly the invention concerns v-triazines of the formula

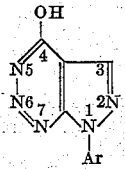

in which Ar represents an aryl residue, and tautomeric forms of these compounds, and also their substitution products in which the tautomerizing hydrogen atom is replaced by a substituent, and salts of these compounds.

In the aforesaid new compounds the aryl residue is preferably an unsubstituted phenyl radical or a phenyl radical substituted, for example, by a halogen atom, such as chlorine, bromine or fluorine or a lower alkoxy or alkyl group, such as a methyl, methoxy, propyl or propoxy radical. The substituent at the hetero-atom in the pyrimidin ring is more especially a lower aliphatic radical. A low aliphatic radical is, for example, a lower hydrocarbon radical in which a carbon atom not bound to the hetero-atom is replaced by a hetero-atom such as nitrogen, for example, a lower tertiary aminoalkyl group, such as a lower dialkylaminoalkyl, e.g. dimethylaminoethyl group. Preferably, however, the aliphatic radical is a lower alkyl group such as methyl.

The new v-triazines have valuable pharmacological properties, especially a diuretic action. Consequently, they are useful as medicaments. They are also valuable as intermediate products for the manufacture of medicaments. Most active as diuretics, and therefore forming a specific and preferred embodiment of the invention distinguished from the other forms of the invention are the v-triazines of the formula

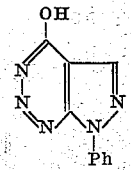

wherein Ph stands for phenyl, halogeno-phenyl, alkoxy-phenyl or alkyl-phenyl, and their substitution products in which the tautomerizing hydrogen is replaced by a lower alkyl group, preferably methyl, and more particularly 1-phenyl-4-hydroxy-pyrazolo[3:4-d]v-triazine and 1-phenyl-4-oxo-5-methyl-4,5-dihydro-pyrazolo[3:4-d]-v-triazine.

The new compounds are made by treating a 5-unsubstituted 2-aryl-3-unsubstituted amino-pyrazole 4-carboxylic acid amide with a diazotizing agent, such as nitrous acid or a salt thereof in the presence of an acid. The reaction is carried out in a manner known for diazotizing reactions, and advantageously in the presence of a diluent, for example, an aqueous acid. The starting material is obtained by reaction of ethoxymethylene-cyano-acetic acid nitrile with the appropriate arylhydrazine and hydrolysis of the obtained 2-aryl-3-amino-4-cyano-pyrazol according to our copending application Serial No. 637,895, filed February 4, 1957.

In the resulting compounds containing a tautomerising hydrogen atom this may be replaced by the lower aliphatic radical by customary methods. For this purpose the compounds are for example reacted with a reactive ester of a lower aliphatic alcohol, if desired, in the presence of a condensing agent such as an alkali or metal alcoholate. Reactive esters are more especially those of strong inorganic or organic acids, for example hydrohalic acids, sulfuric acid or organic sulfonic acids, for example, benzene sulfonic acids. The preferred substituting agents are lower alkyl halides, such as chlorides, bromides or iodides.

Depending on the reaction conditions the new compounds are obtained in the free form or in the form of salts thereof, and the free compounds can be converted into their salts or vice versa. Thus, the free bases may be converted into their therapeutically acceptable salts, for example, by reaction with inorganic or organic acids, such as hydrohalic acids, sulfuric acid, nitric acid, perchloric acid, phosphoric acids, formic acid, acetic acid, propionic acid, lactic acid, oxalic acid, succinic acid, malic acid, tartaric acid, citric acid, ascorbic acid, methane sulfonic acid, ethane sulfonic acid, oxyethane sulfonic acid, benzoic acid, salicylic acid, para-aminosalicylic acid, toluene sulfonic acid, or naphthalene sulfonic acids.

The new pyrazolo-v-triazines or salts thereof may be used in the form of pharmaceutical preparations. These preparations contain the new compound in admixture with a pharmaceutical organic or inorganic carrier suitable for enteral or parenteral administration. As the carriers there are used substances which do not react with the new compounds, for example, gelatine, lactose, starches, water, magnesium stearate, talc, vegetable oils, benzyl alcohols, gums, polyalkylene glycols, cholesterol or other known carriers for medicaments. The pharmaceutical preparations may be, for example, in the form of tablets, dragees or in liquid form as solutions, suspensions or emulsions. If desired they may be sterilized and/or may contain auxiliary substances, such as preserving, stabilizing, wetting or emulsifying agents. They may also contain other therapeutically valuable substances. The preparations are made up by the usual methods.

The following examples illustrate the invention:

Example 1

A solution of 20 grams of 2-phenyl-3-amino-4-carbamyl-pyrazole in 150 cc. of 2N-hydrochloric acid is mixed at 0–10° C. with 6.9 grams of sodium nitrite dissolved in 40 cc. of water, whereby a yellow precipitate separates out. In order to complete the reaction the whole is stirred for a further 2 hours at room temperature, then the precipitated product is filtered off with suction and washed with water. It is recrystallized from alcohol to yield 1-phenyl-4-hydroxy-pyrazolo[3:4-d]-v-triazine of the formula

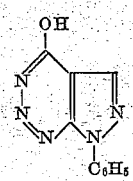

in the form of yellowish crystals melting at 136° C. with decomposition.

The starting material can be obtained as follows:
24.4 parts of ethoxymethylenemalonic acid dinitrile are dissolved in 250 parts by volume of ethyl alcohol. The solution is then slowly mixed with 2.2 parts of phenylhydrazine and boiled for 10 hours. The reaction mass is allowed to cool, after which a crystalline product precipitates which is separated by filtering with suction. By recrystallization from alcohol there is obtained 2-phenyl-3-amino-4-cyanopyrazole of the formula

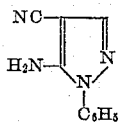

in the form of crystals of melting point 135–137° C.

100 parts by volume of 2 N-caustic soda solution are added to a solution of 5 parts of 2-phenyl-3-amino-4-cyano-pyrazole in 100 parts by volume of alcohol and the mixture boiled for 3 hours. The alcohol is then expelled under reduced pressure, whereupon a solid product precipitates. The latter is recrystallized and 2-phenyl-3-amino-4-carbamyl-pyrazole of the formula

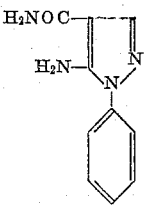

obtained in the form of crystals melting at 167–168° C.

Example 2

10.6 grams of 1-phenyl-4-hydroxy-pyrazolo[3:4-d]v-triazine are introduced into a sodium methylate solution prepared from 1.2 grams of sodium and 400 cc. of anhydrous alcohol. In order to form the sodium salt the mixture is stirred for 3 hours at room temperature. 7.2 grams of chlorethyl-dimethylamine are added to the suspension so formed, the whole is heated at the boil for 6 hours, then evaporated to dryness in vacuo, and the residue is dissolved in water and extracted with chloroform. The chloroform is evaporated from the extract and the residue is recrystallized from isopropyl ether to yield 1-phenyl-5-dimethylaminoethyl-4-oxo-4:5-dihydro-pyrazolo[3:4-d]v-triazine of the formula

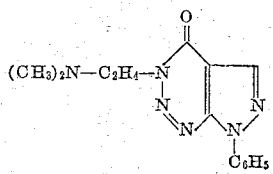

in the form of crystals melting at 103–105° C.

Example 3

7.4 grams of dimethyl sulfate are added to a solution of 10 grams of 1-phenyl-4-hydroxy-pyrazolo-[3:4-d]-v-triazine in 50 cc. of a 2 N-solution of caustic soda, while stirring and cooling with ice. The whole is allowed to stand for 5 hours at room temperature, and then the precipitate is filtered off with suction. The precipitate is recrystallized from a large quantity of petroleum ether to yield 1-phenyl-5-methyl-4-oxo-4:5-dihydropyrazolo[3:4-d]v-triazine of the formula

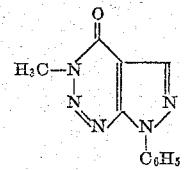

in the form of white crystals melting at 136–137° C.

Example 4

3.45 grams of sodium nitrite dissolved in 20 cc. of water are added to a solution of 12 grams of 2-para-chloro-phenyl-3-amino-4-carbamyl-pyrazole in 75 cc. of 2 N-hydrochloric acid at 0–10° C., a yellow precipitate separating off. In order to complete the reaction the whole is stirred for 2 hours at room temperature, the precipitate is filtered off with suction and washed with water. It is recrystallized from ethanol, and 1-para-chloro-phenyl-4-hydroxy-pyroxy-pyrazolo[3,4-d]v-triazine of the formula

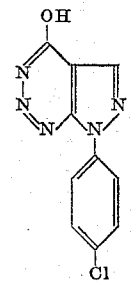

is obtained in the form of yellow crystals melting at 160° C. with decomposition.

The 2-para-chlorophenyl-3-amino-4-carbamyl-pyrazole used as starting material is prepared in the following manner:

A solution of 55 grams of para-chlorophenylhydrazine in 250 cc. of ethanol is added to a solution of 47 grams of ethoxymethylene-malonitrile in 500 cc. of ethanol. The reaction solution is boiled under reflux for 4 hours. It is then allowed to cool and the 2-para-chlorophenyl-3-amino-4-cyano-pyrazole of the formula

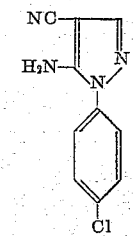

formed is filtered with suction. It melts at 170–171° C.

400 cc. of 2 N-caustic soda solution and 400 cc. of ethanol are added to 21 grams of 2-para-chlorophenyl-3-amino-4-cyano-pyrazole. The mixture is then boiled under reflux for 4 hours. The ethanol is evaporated in vacuo, the residue after cooling is filtered with suction, and by recrystallization from ample boiling ethanol there is obtained 2-para-chlorophenyl-3-amino-4-carbamyl-pyrazole of the formula

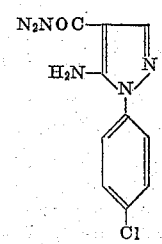

in the form of white crystals melting at 203–204° C.

What is claimed is:
1. Compounds of the formula

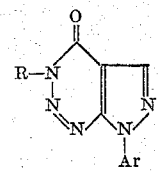

wherein Ar represents phenyl and R represents a lower alkyl radical.

2. 1-phenyl-5-methyl-4 - oxo - 4,5 - dihydro - pyrazolo-(3,4-d)v-triazine.

3. 1-phenyl-4-hydroxy-pyrazolo(3,4-d)v-triazine.

4. 1-phenyl-5 - dimethylaminoethyl - 4 - oxo - 4,5 - dihydro-pyrazolo(3,4-d)v-triazine.

5. 1-p - chlorophenyl - 4 - hydroxy - pyrazolo(3,4-d)v-triazine.

6. Compounds of the formulae:

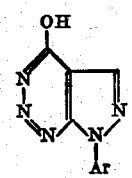

and

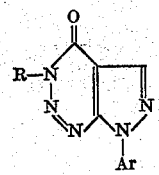

wherein Ar represents a member selected from the group consisting of phenyl, halogeno-phenyl, lower alkyl phenyl and lower alkoxy phenyl and R represents a member selected from the group consisting of a lower alkyl radical and a lower dialkylamino-lower alkyl radical, and therapeutically acceptable acid addition salts thereof.

7. A therapeutically useful acid addition salt of a compound of claim 4.

References Cited in the file of this patent

Justoni: Gazz. chim. Ital., vol. 68, pp. 64–66, 72–73, 75 (1938).

UNITED STATES PATENT OFFICE
CERTIFICATE OF CORRECTION

Patent No. 2,925,418　　　　　　　　　　　　February 16, 1960

Jean Druey et al.

It is hereby certified that error appears in the printed specification of the above numbered patent requiring correction and that the said Letters Patent should read as corrected below.

Column 4, line 8, strike out "pyroxy-"; lines 55 to 63, the formula should appear as shown below instead of as in the patent:

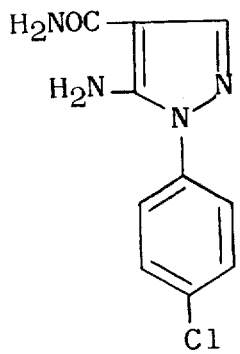

Signed and sealed this 10th day of January 1961.

(SEAL)
Attest:

KARL H. AXLINE
Attesting Officer

ROBERT C. WATSON
Commissioner of Patents